United States Patent
Xin et al.

(10) Patent No.: US 9,629,016 B2
(45) Date of Patent: Apr. 18, 2017

(54) CSI-RSRP MEASUREMENT PERIOD CONFIGURATION METHOD AND TERMINAL

(71) Applicant: ZTE CORPORATION, Shenzhen, Guangdong Province (CN)

(72) Inventors: Yu Xin, Shenzhen (CN); Qian Yang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 85 days.

(21) Appl. No.: 14/404,484

(22) PCT Filed: Sep. 16, 2013

(86) PCT No.: PCT/CN2013/083553
§ 371 (c)(1),
(2) Date: Nov. 28, 2014

(87) PCT Pub. No.: WO2014/040563
PCT Pub. Date: Mar. 20, 2014

(65) Prior Publication Data
US 2015/0181450 A1 Jun. 25, 2015

(30) Foreign Application Priority Data

Sep. 17, 2012 (CN) .......................... 2012 1 0344204

(51) Int. Cl.
*H04W 24/10* (2009.01)
*H04B 7/06* (2006.01)
(Continued)

(52) U.S. Cl.
CPC .......... *H04W 24/10* (2013.01); *H04L 5/0048* (2013.01); *H04W 76/048* (2013.01); *H04B 7/0626* (2013.01)

(58) Field of Classification Search
CPC . H04W 24/10; H04W 36/0088; H04W 48/16; H04W 76/048; H04B 7/0626
See application file for complete search history.

(56) References Cited

U.S. PATENT DOCUMENTS

2012/0147772 A1* 6/2012 Kazmi ................. H04L 5/0078
370/252
2012/0190356 A1* 7/2012 Zhao ..................... H04L 5/0035
455/422.1

FOREIGN PATENT DOCUMENTS

CN 102036264 A 4/2011

OTHER PUBLICATIONS

Li et al, Draft LS response on CSI-RS based measurement for CoMP, 3GPP TSG-RAN WG4 Meeting #64, Qingdao, China, Aug. 13-17, 2012, R4-124224.*

(Continued)

*Primary Examiner* — Chi H Pham
*Assistant Examiner* — Shailendra Kumar
(74) *Attorney, Agent, or Firm* — Ling Wu; Stephen Yang; Ling and Yang Intellectual Property

(57) ABSTRACT

A method for configuring a channel state information reference signal (CSI-RS) received power (CSI-RSRP) measurement period is provided. The method includes: a terminal in a discontinuous reception (DRX) state setting the measurement period in the following way: T=N×Max ($P_{DRX}$, Pcsi-rs) and T>=200 milliseconds, or T=N×Max ($P_{DRX}$, 0.08 seconds) and T>=200 milliseconds, or T=N× LCM ($P_{DRX}$, Pcsi-rs) and T>=200 milliseconds; wherein T is the measurement period, N is a natural number, Pcsi-rs is a transmission period of the CSI-RS, the $P_{DRX}$ is a DRX period of the terminal, the Max ($P_{DRX}$, Pcsi-rs) represents selecting the maximum value of the $P_{DRX}$ and the Pcsi-ars, the Max ($P_{DRX}$, 0.08 seconds) represents selecting the maximum value of the $P_{DRX}$ and 0.08 seconds, and the LCM ($P_{DRX}$, Pcsi-rs) represents the least common multiple of the $P_{DRX}$ and the Pcsi-rs.

18 Claims, 1 Drawing Sheet

(51) Int. Cl.
  *H04W 76/04* (2009.01)
  *H04L 5/00* (2006.01)

(56) References Cited

OTHER PUBLICATIONS

Huawei and HiSilicon, Analysis of Triggering Events for CSI-RSRP Measurement Reporting, 3GPP TSG-RAN WG2 Meeting #79, Qingdao, China, Aug. 13-17, 2012, R2-123933.*
Ericsson, ST-Ericsson, Additional link simulation results for CSI-RSRP requirements, 3GPP TSG-RAN WG4 Meeting #63AH, Qingdao, China, Aug. 13-17, 2012, R4-124423.*
Samsung, Considerations for antenna ports assumption for CSI-RSRP measurement, 3GPP TSG-RAN WG4 Meeting #64, Qingdao, China, Aug. 13-17, 2012, R4-123857.*
ZTE, Link level simulation results for CSI-RSRP measurement, 3GPP TSG-RAN WG4 Meeting #64, Qingdao, China, Aug. 13-17, 2012, R4-123837.*
3rd Generation Partnership Project, Technical Specification Group Radio Access Network; Evolved Universal Terrestrial Radio Access (E-UTRA); Requirements for support of radio resource management (Release 11); Jun. 2012, 3GPP TS 36.133 V11.1.0.*

\* cited by examiner

CSI-RSRP MEASUREMENT PERIOD CONFIGURATION METHOD AND TERMINAL

TECHNICAL FIELD

The present document relates to the communication field, and in particular, to a method for configuring a channel state information reference signal received power (CSI-RSRP) measurement period and a terminal.

BACKGROUND OF THE RELATED ART

The Long Term Evolution (LTE) is the Fourth Generation (4G) wireless cellular communication technology, which supports various system bandwidths with the highest 20 MHz and can reach the peak rate of 200 Mbit/s. Compared with 3G technology, it has a shorter time delay and provides the seamless voice and multimedia services. The fast and efficient switchover is the basis to guarantee the incessant service and good user experience. The switchover is performed based on some specific parameters of the cell, such as, the measurement accuracy of the signal, the gap of the measurement and delay. The measurement period of the signal has an important influence for the switchover; if the measurement period is too long, then it may result that the switchover is not in time and cause the drop call or the uncomfortable user experience; if the measurement period is too short, then it causes the needless complexity and power consumption and the reduced measurement accuracy of the user equipment (UE).

The terminal in the LTE Release 8 needs to measure the signal power of the received Cell-specific reference signal (CRS), and then, according to the criterion of the base station configuration, it reports to the base station after meeting the criterion. The power of the received CRS signal is the reference signal received power (RSRP), which is defined as the mean value of the linear power on the resource position carrying the CRS signal in the measurement bandwidth.

In the LTE Release 8 standard, there have been some regulations for the measurement accuracy and period of the RSRP based on the CRS. There are different regulations for the measurement period of the RSRP of the CRS under the discontinuous reception (DRX) mode and the Non-Discontinuous Reception (Non-DRX) mode. The so-called Non-DRX mode is that, under the situation without configuring the measurement gap, the terminal can receive the signal and measure it at any time. Under the DRX mode, the terminal can receive the signal and measure it only under the active situation, while it usually cannot perform the measurement under the sleep situation. The DRX period configuration generally includes 10 ms, 20 ms, 32 ms, 40 ms, 64 ms, 80 ms, 128 ms, 160 ms, 256 ms, 320 ms, 512 ms, 640 ms, 1024 ms, 1280 ms, 2048 ms and 2560 ms. During one DRX period, the shortest active time is 1 ms and the longest active time is 200 ms.

In the LTE Release 10 standard, it introduces a new Channel-State Information Reference Signal (CSI-RS). The difference between the CSI-RS and the CRS includes the following several respects:

(1), the CSI-RS is periodically sent only on some subframes, and the CRS is sent on every subframe; the transmission period and the transmission subframe of the CSI-RS is shown in Table 1;

TABLE 1

| CSI-RS subframe configuration | | |
|---|---|---|
| CSI-RS subframe configuration $I_{CSI-RS}$ | CSI-RS Period $T_{CSI-RS}$ (subframe) | CSI-RS subframe offset $\Delta_{CSI-RS}$ (subframe) |
| 0-4 | 5 | $I_{CSI-RS}$ |
| 5-14 | 10 | $I_{CSI-RS}$ - 5 |
| 15-34 | 20 | $I_{CSI-RS}$ - 15 |
| 35-74 | 40 | $I_{CSI-RS}$ - 35 |
| 75-154 | 80 | $I_{CSI-RS}$ - 75 |

It can be seen from Table 1 that there are six kinds of configurations for the transmission period of the CSI-RS, 5 ms, 10 ms, 20 ms, 40 ms, 80 ms (the number of the subframes represents the period in Table 1, and the time of one subframe is 1 ms).

(2), the density of the CSI-RS in the frequency domain and the time domain (in one subframe) is far lower than the density of CRS.

(3), the CSI-RS is a UE specific reference signal, and the CRS is a cell specific reference signal.

In the conventional cellular communication network, in a certain area coverage, the Physical Cell Identifiers (PCI) of the cells are not identical; in this way, it can identify the signal of which cell is stronger through measuring the signal intensity of the CRS, so it can meet the requirement of the switchover by measuring the RSRP of the CRS. But with the development of the communication network, in the future cellular communication network, the situation that multiple cells share the PCI will appear, then it is unable to realize the efficient switchover only based on the measurement result of the RSRP of the CRS. And the CSI-RS is the UE specific, and the network side can determine which UE is required to be switched to which cell according to the intensity of the received signal of the CSI-RS reported by the UE. So the measurement of the CSI-RS is essential in the future communication network. And in the later Coordinated Multiple Point (Comp) technology, the management of the Comp measurement set also needs to be based on the RSRP measurement of the CSI-RS.

However, the RSRP measurement of the CSI-RS, including defining the measurement period and the measurement accuracy, has not been defined currently in the advanced LTE (LTE-A) standard yet; in order to realize the efficient switchover in the future evolved network, it is very necessary to define the RSRP measurement of the CSI-RS. Especially, when the terminal is in the DRX mode, because the period of CSI-RS and the period of the DRX may probably be different, the configuration based on the measurement period of the RSRP of CSI-RS is more complicated.

SUMMARY OF THE INVENTION

The embodiment of the present document provides a method for configuring a CSI-RSRP measurement period and terminal, to solve the problem that the related art does not provide the measurement period of the RSRP of the CSI-RS (abbreviated as CSI-RSRP) in the DRX mode.

The embodiment of the present document provides a method for configuring a channel state information reference signal (CSI-RS) received power (CSI-RSRP) measurement period, comprising:

a terminal in a discontinuous reception (DRX) state setting a measurement period in a following way:

$T = N \times \text{Max}(P_{DRX}, \text{Pcsi-rs})$ and $T \geq 200$ milliseconds; or
$T = N \times \text{Max}(P_{DRX}, 0.08 \text{ seconds})$ and $T \geq 200$ milliseconds; or
$T = N \times \text{LCM}(P_{DRX}, \text{Pcsi-rs})$ and $T \geq 200$ milliseconds;

wherein T is the measurement period, N is a natural number, Pcsi-rs is a transmission period of CSI-RS, the $P_{DRX}$ is a DRX period of the terminal, the Max $(P_{DRX}, \text{Pcsi-rs})$ represents selecting a maximum value of the $P_{DRX}$ and the Pcsi-rs, the Max $(P_{DRX}, 0.08 \text{ seconds})$ represents selecting a maximum value of the $P_{DRX}$ and 0.08 seconds, and the LCM $(P_{DRX}, \text{Pcsi-rs})$ represents a least common multiple of the $P_{DRX}$ and the Pcsi-rs.

Preferably, after the terminal sets the measurement period, the method further comprises:

the terminal measuring a CSI-RSRP as per the set measurement period according to the CSI-RS.

Preferably, the terminal measures the CSI-RSRP as per the measurement period according to the CSI-RS, comprising:

the terminal measuring the CSI-RSRP according to the CSI-RS of one or more subframes in one measurement period.

Preferably, after the terminal measures the CSI-RSRP, the method further comprises:

the terminal reporting CSI-RSRP information to a current serving base station of the terminal according to a period reporting way.

Preferably, a period for reporting the CSI-RSRP information is equal to the measurement period.

Preferably, after the terminal measures the CSI-RSRP, the method further comprises:

the terminal reporting CSI-RSRP information to a current serving base station of the terminal according to a triggering reporting way.

Preferably, the terminal measures the CSI-RSRP as per the set measurement period according to the CSI-RS, comprising:

the terminal measuring the CSI-RSRP as per the measurement period according to a CSI-RS sent by a base station.

Preferably, the terminal measures the CSI-RSRP as per the measurement period according to the CSI-RS sent by the base station, comprising:

the terminal measuring the CSI-RSRP as per the measurement period according to a CSI-RS sent by a base station which configures a CSI-RS signal related to the terminal.

Preferably, a frequency domain bandwidth of the CSI-RS$\geq$6PRB; or the frequency domain bandwidth of the CSI-RS is a system bandwidth of the base station signal.

Preferably, the terminal measures the CSI-RSRP as per the measurement period according to the CSI-RS sent by the base station, comprising:

the terminal measuring and obtaining the CSI-RSRP according to a CSI-RS of a single antenna port configured by the base station; or the terminal measuring and obtaining the CSI-RSRP according to CSI-RSs of 2 antenna ports configured by the base station respectively, and taking a sum of the two obtained CSI-RSRPs as a measured CSI-RSRP; or the terminal measuring and obtaining the CSI-RSRP according to CSI-RSs of 2 antenna ports configured by the base station respectively, and taking a mean value of the two obtained CSI-RSRPs as a measured CSI-RSRP.

Preferably, when the measurement period is configured as: $T = N \times \text{Max}(P_{DRX}, \text{Pcsi-rs})$, and $T \geq 200$ milliseconds, a preferred value of the measurement period is any one of following situations:

when $P_{DRX} \leq 40$ ms and Pcsi-rs=5, 10, 20 or 40 subframes or ms, the T is preferably 200 or 400 ms;

when $40 \text{ ms} < P_{DRX} \leq 80$ ms and Pcsi-rs=5, 10, 20 or 40 subframes or ms, the T is preferably 320 or 640 ms;

when $P_{DRX} \leq 80$ ms and Pcsi-rs=80 subframes or ms, the T is preferably 400 or 800 ms;

when $80 \text{ ms} < P_{DRX} \leq 120$ ms and Pcsi-rs=5, 10, 20 or 40 subframes or ms, the T is preferably $5 * P_{DRX}$;

when $80 \text{ ms} < P_{DRX} \leq 120$ ms and Pcsi-rs=80 subframes or ms, $5 * P_{DRX} \leq T \leq 10 * P_{DRX}$;

when $P_{DRX} \leq 40$ ms and Pcsi-rs$\leq$40 subframes or ms, the T is preferably 400 ms;

when $40 \text{ ms} < P_{DRX} \leq 80$ ms, and Pcsi-rs$\leq$40 subframes or ms, the T is preferably 640 ms;

when $P_{DRX} \leq 80$ ms, and Pcsi-rs=80 subframes or ms, the T is preferably 800 ms;

when $80 \text{ ms} < P_{DRX} \leq 120$ ms, and Pcsi-rs$\leq$40 subframes or ms, the T is preferably $5 * P_{DRX}$; and when $P_{DRX} > 120$ ms, the T is preferably $5 * P_{DRX}$.

Preferably, when the measurement period is configured as: $T = N \times \text{Max}(P_{DRX}, 0.08 \text{ seconds})$, and $T \geq 200$ milliseconds, a preferred value of the measurement period is any one of following situations:

when PDRX>0.08 ms, the T is preferably 5*PDRX; and when PDRX$\leq$0.08 ms, the T is preferably 0.4 seconds.

The embodiment of the present document further provides a terminal, comprising: in a discontinuous reception (DRX) state, a setting module, configured to set a measurement period in a following way:

$T = N \times \text{Max}(P_{DRX}, \text{Pcsi-rs})$ and $T \geq 200$ milliseconds; or
$T = N \times \text{Max}(P_{DRX}, 0.08 \text{ seconds})$ and $T \geq 200$ milliseconds; or
$T = N \times \text{LCM}(P_{DRX}, \text{Pcsi-rs})$ and $T \geq 200$ milliseconds;

wherein T is the measurement period, N is a natural number, Pcsi-rs is a transmission period of CSI-RS, the $P_{DRX}$ is a DRX period of the terminal, the Max $(P_{DRX}, \text{Pcsi-rs})$ represents selecting a maximum value of the $P_{DRX}$ and the Pcsi-rs, the Max $(P_{DRX}, 0.08 \text{ seconds})$ represents selecting a maximum value of the $P_{DRX}$ and 0.08 seconds, and the LCM $(P_{DRX}, \text{Pcsi-rs})$ represents a least common multiple of the $P_{DRX}$ and the Pcsi-rs.

Preferably, the terminal further comprises:

a measurement module, configured to measure a CSI-RSRP as per the measurement period set by the setting module according to a channel state information reference signal (CSI-RS).

Preferably, the measurement module is configured to: measure the CSI-RSRP according to CSI-RS of one or more subframes in one measurement period.

Preferably, the terminal further comprises:

a reporting module, configured to: report CSI-RSRP information measured by the measurement module to a current serving base station of the terminal according to a period reporting way.

Preferably, a period for reporting the CSI-RSRP information is equal to the measurement period.

Preferably, the terminal further comprises:

a reporting module, configured to: report CSI-RSRP information measured by the measurement module to a current serving base station of the terminal according to a triggering reporting way.

Preferably, the measurement module is configured to: measure the CSI-RSRP as per the measurement period according to a CSI-RS sent by a base station.

Preferably, the measurement module is configured to: measure the CSI-RSRP as per the measurement period according to a CSI-RS sent by a base station which configures a CSI-RS signal related to the terminal.

Preferably, a frequency domain bandwidth of the CSI-RS>=6PRB; or the frequency domain bandwidth of the CSI-RS is a system bandwidth of the base station signal.

Preferably, the measurement module is configured to: measure and obtain the CSI-RSRP according to a CSI-RS of a single antenna port configured by the base station; or to measure and obtain the CSI-RSRP respectively according to CSI-RSs of 2 antenna ports configured by the base station, and take a sum of the two obtained CSI-RSRPs as a measured CSI-RSRP; or to measure and obtain the CSI-RSRP respectively according to CSI-RSs of 2 antenna ports configured by the base station, and take a mean value of the two obtained CSI-RSRPs as a measured CSI-RSRP.

Preferably, when the measurement period set by the setting module is: T=N×Max($P_{DRX}$, Pcsi-rs), and T>=200 milliseconds, a preferred value of the measurement period is any one of following situations:

when $P_{DRX}$<=40 ms and Pcsi-rs=5, 10, 20 or 40 subframes or ms, the T is preferably 200 or 400 ms;

when 40 ms<$P_{DRX}$<=80 ms and Pcsi-rs=5, 10, 20 or 40 subframes or ms, the T is preferably 320 or 640 ms;

when $P_{DRX}$<=80 ms and Pcsi-rs=80 subframes or ms, the T is preferably 400 or 800 ms;

when 80 ms<$P_{DRX}$<=120 ms and Pcsi-rs=5, 10, 20 or 40 subframes or ms, the T is preferably 5*$P_{DRX}$;

when 80 ms<$P_{DRX}$<=120 ms and Pcsi-rs=80 subframes or ms, 5*$P_{DRX}$<=T<=10*$P_{DRX}$;

when $P_{DRX}$<=40 ms and Pcsi-rs<=40 subframes or ms, the T is preferably 400 ms;

when 40 ms<$P_{DRX}$<=80 ms, and Pcsi-rs<=40 subframes or ms, the T is preferably 640 ms;

when $P_{DRX}$<=80 ms, and Pcsi-rs=80 subframes or ms, the T is preferably 800 ms;

when 80 ms<$P_{DRX}$<=120 ms, and Pcsi-rs<=40 subframes or ms, the T is preferably 5*$P_{DRX}$; and when $P_{DRX}$>120 ms, the T is preferably 5*$P_{DRX}$.

Preferably, when the measurement period set by the setting module is: T=N×Max($P_{DRX}$, 0.08 seconds), and T>=200 milliseconds, a preferred value of the measurement period is any one of following situations:

when $P_{DRX}$>0.08 ms, the T is preferably 5*$P_{DRX}$; and when $P_{DRX}$<=0.08 ms, the T is preferably 0.4 seconds.

The above-mentioned method for configuring a CSI-RSRP measurement period and terminal provide the setting of the CSI-RSRP measurement period under the DRX mode, which makes abundant preparations for effectively realizing the switchover in the future evolved network.

PREFERRED EMBODIMENTS OF THE PRESENT DOCUMENT

The embodiment of the present document is described in detail with reference to the accompanying drawings hereinafter. It should be illustrated that, in the case of not conflicting, the embodiments in the present application and features in these embodiments can be combined with each other at random.

Just as mentioned in the background of the related art, the RSRP measurement of the CSI-RS, including defining the measurement period and the measurement accuracy, has not been defined currently in the LTE-A standard to some extent yet; in order to realize the efficient switchover in the future evolved network, it is very necessary to define the RSRP measurement of the CSI-RS. Especially, when the terminal is in the DRX mode, because the period of CSI-RS and the period of the DRX may probably be different, the configuration based on the measurement period of the RSRP of the CSI-RS (abbreviated as CSI-RSRP) is more complicated.

The present document provides the solution on the CSI-RSRP measurement period under the DRX mode.

Setting the CSI-RSRP measurement period needs to consider three factors: the measurement accuracy of the RSRP, the power consumption of the terminal and the time delay of the RSRP reporting period for the system demand.

It has already been mentioned in the previous background of the related art that a difference between the CSI-RS and the CRS is: the CRS is sent on every subframe and the CSI-RS is sent periodically only on some subframes; and the density of the CSI-RS in a subframe is far lower than the density of the CRS. These characteristics of the CSI-RS will influence the measurement accuracy of the CSI-RSRP, so the measurement accuracy of the CSI-RSRP is a problem required to be considered especially.

In order to guarantee the measurement accuracy of the CSI-RSRP, it is required that in one CSI-RSRP measurement period, the number of measured CSI-RS subframes cannot be too few. In this paper, the so-called CSI-RS subframe refers to the subframe including the CSI-RS signal. So, the longer the period of the CSI-RS is, the longer the measurement period of the CSI-RSRP needs to be. Within one DRX period, the terminal can generally measure the CSI-RSRP in the active state while it does not measure the CSI-RSRP in the sleep state; certainly, it does not exclude that a few terminal measures the CSI-RSRP in the sleep state as well, and this is the specific implementation problem of the terminal. Therefore, generally speaking, the longer the DRX period is, the longer the measurement period of the CSI-RSRP needs to be as well.

Figure 1:
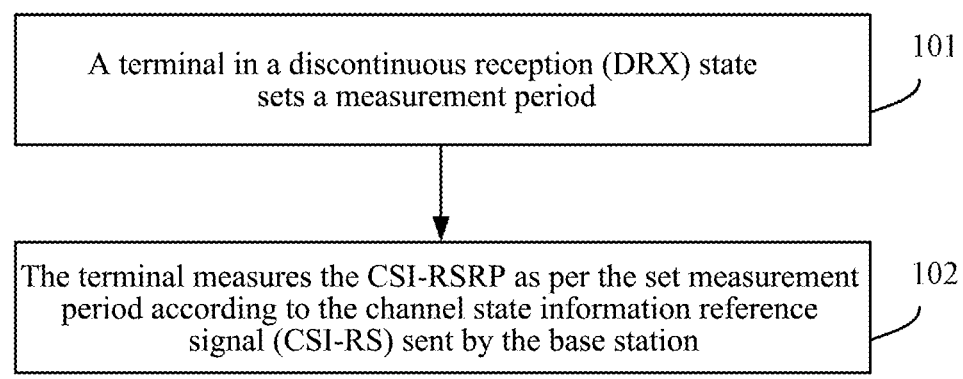
FIG. 1 is a flow chart of method for configuring a CSI-RSRP measurement period of an embodiment of the present document.

As shown in FIG. 1, it is a flow chart of method for configuring a CSI-RSRP measurement period of an embodiment of the present document. The method includes the following steps.

In step 101, a terminal in a discontinuous reception (DRX) state sets a measurement period in the following way:

T=N×Max ($P_{DRX}$, Pcsi-rs) and T>=200 milliseconds; or

T=N×Max ($P_{DRX}$, 0.08 seconds) and T>=200 milliseconds; or

T=N×LCM ($P_{DRX}$, Pcsi-rs) and T>=200 milliseconds;

wherein T is the measurement period, N is a natural number, Pcsi-rs is a transmission period of the CSI-RS, the $P_{DRX}$ is a DRX period of the terminal, the Max ($P_{DRX}$, Pcsi-rs) represents selecting a maximum value of the $P_{DRX}$ and the Pcsi-rs, the Max ($P_{DRX}$, 0.08 seconds) represents selecting a maximum value of the $P_{DRX}$ and 0.08 seconds, and the LCM ($P_{DRX}$, Pcsi-rs) represents a least common multiple of the $P_{DRX}$ and the Pcsi-rs.

In step 102, the terminal measures the CSI-RSRP as per the set measurement period according to the CSI-RS.

The step is an alternatively step, and the step 102 is specifically that: the terminal estimates the CSI-RSRP based on a preset algorithm as per the set measurement period according to the CSI-RS; the preset algorithm is an existing algorithm and can be flexibly selected according to the requirement; it needs to be illustrated that the meanings of "measuring according to the set measurement period" and the current "measurement" here are the same, and the former is just: to complete the measurement in a set time interval or period.

The step 102 includes that the terminal measures the CSI-RSRP as per the set measurement period according to the CSI-RS sent by the terminal.

In order to reduce the power consumption of the terminal, in the case without obviously influencing the measurement accuracy, in one measurement period T, the terminal can only measure the CSI-RS signal of one subframe to obtain the CSI-RSRP. For example, when the channel environment where the terminal is located is better and the received signal to noise ratio (SNR) is higher, at this moment, the terminal can only measure the CSI-RS signal of one subframe to obtain the CSI-RSRP. If the channel environment where the terminal is located is not good and the received signal to noise ratio SNR is relatively low, in order to guarantee the measurement accuracy of the CSI-RSRP, in one measurement period T, the terminal needs to measure several CSI-RS subframes more. So the terminal can make a balance between the power consumption and the measurement accuracy of the CSI-RSRP and consider selecting several CSI-RS subframes to measure according to the actual condition of its own power consumption.

After the terminal measures the CSI-RSRP, it can report to the current serving base station depending upon requirement. The way of reporting can be according to a period reporting way and can also be according to a triggering reporting way. Regarding the period reporting way, the period for reporting the CSI-RSRP information can be equal to or not equal to the measurement period T. Regarding the triggering reporting way, it mainly triggers to report the CSI-RSRP information according to the signaling indication of the current serving base station. The current serving base station and the base station for transmitting the CSI-RS signal may not be the same base station. The base station for transmitting the CSI-RS signal is the base station which configures the CSI-RS signal related to the terminal. That is to say, some base station (it may be a neighboring base station, not the current serving base station) configures some CSI-RS signal for the terminal, and the terminal obtains the CSI-RSRP of the base station through measuring the CSI-RS signal and then reports it to the current serving base station of the terminal.

Generally speaking, if the measurement period T is smaller, it will be too frequent that the terminal reports the RSRP according to period T, which will increase the power consumption of the terminal. So it is required that T>=200 milliseconds. 200 milliseconds are not too long, which will not influence the time delay of the RSRP reporting. Certainly, if the measurement period T is too long, then it will influence the time delay of the RSRP reporting and influence the update speed of the system for the CSI-RSRP demand. Therefore, the measurement period T is suggested to be preferably less than 10 seconds.

Further, for the situation that $T=N \times Max(P_{DRX}, Pcsi\text{-}rs)$ and T>=200 milliseconds, when the measurement period T meets the above principle, the suggested optimal measurement period is shown in Table 2 and Table 3.

TABLE 2

Optimal measurement period

| measurement period T | | CSI-RS periodicity Pcsi-rs (Unit: subframes or milliseconds) | | | | |
|---|---|---|---|---|---|---|
| | | 5 | 10 | 20 | 40 | 80 |
| DRX period $P_{DRX}$ | $P_{DRX}$ <= 40 ms | 200 or 400 milliseconds | 200 or 400 milliseconds | 200 or 400 milliseconds | 200 or 400 milliseconds | 400 or 800 milliseconds |
| | 40 ms < $P_{DRX}$ <= 80 ms | 320 or 640 milliseconds | 320 or 640 milliseconds | 320 or 640 milliseconds | 320 or 640 milliseconds | 400 or 800 milliseconds |
| | 80 ms < $P_{DRX}$ <= 120 ms | 5* $P_{DRX}$ | 5* $P_{DRX}$ | 5* $P_{DRX}$ | 5* $P_{DRX}$ | 5* $P_{DRX}$ <= T <= 10* $P_{DRX}$ |

TABLE 3

Optimal measurement period

| measurement period T | | CSI-RS periodicity Pcsi-rs (Unit: subframes or milliseconds) | |
|---|---|---|---|
| | | <=40 | 80 |
| DRX period $P_{DRX}$ | $P_{DRX}$ <= 40 ms | 400 | 800 |
| | 40 ms <$P_{DRX}$ <= 80 ms | 640 | 800 |
| | 80 ms <$P_{DRX}$ <=120 ms | 5* $P_{DRX}$ | 5* $P_{DRX}$ <= T <= 10* $P_{DRX}$ |
| | $P_{DRX}$ >120 ms | 5* $P_{DRX}$ | 5* $P_{DRX}$ |

Similarly, for the situation that $T=N \times Max(P_{DRX}, 0.08$ seconds) and T>=200 milliseconds, when the measurement period T meets the above principle, the suggested optimal measurement period is shown in Table 4.

TABLE 4

Optimal measurement period

| DRX cycle length (s) | measurement period T (s) |
|---|---|
| >0.08 | 5* PDRX |
| <=0.08 | 0.4 |

By adopting the measurement period T made by the above 3 tables, it can also reduce the complexity of selecting the measurement period by the system and the terminal. The system and the terminal can obtain the measurement period T through the looking up the table according to the current CSI-RS period and the DRX period of terminal directly.

In addition, when the base station configures the CSI-RS signal of the single antenna port, then the terminal measures and obtains the CSI-RSRP according to the CSI-RS signal of the single antenna port; when the base station configures the CSI-RS signal of 2 antenna ports, then the terminal takes a sum or a mean value of the CSI-RSRPs measured and obtained according to the CSI-RS signals of the 2 antenna ports respectively as the measured CSI-RSRP.

When the base station configures the CSI-RS signals of the 4 antenna ports or 8 antenna ports, the terminal can take the CSI-RSRP measured and obtained according to the CSI-RS signals of the 4 antenna ports or 8 antenna ports as the measured CSI-RSRP. However, the terminal will consume more power consumption if measuring more antenna ports, and measuring more antenna ports cannot obviously improve the measurement accuracy. Therefore, considering from a perspective of reducing the power consumption of the terminal, the suggestion is that: when the base station configures the CSI-RS signal of the 4 antenna ports or 8 antenna ports, the terminal still takes the sum or the mean value of the CSI-RSRPs measured and obtained according to the CSI-RS signals of the 2 antenna ports therein respectively as the measured CSI-RSRP.

In addition, regarding the measurement bandwidth of frequency domain of the CSI-RS signal, it can select measuring the bandwidth of 6PRB and also can measure the bandwidth occupied by the CSI-RS signal (generally speaking, the bandwidth occupied by the CSI-RS signal is the system bandwidth of the base station signal, so it can measure directly according to the system bandwidth of the base station); and it also can select a certain bandwidth between the bandwidths occupied by the 6PRB and CSI-RS signal for the measurement (that is, selecting the frequency domain bandwidth of the CSI-RS signal >=6PRB).

The above-mentioned method for configuring the CSI-RSRP measurement period provides the setting of the CSI-RSRP measurement period under the DRX mode, which makes abundant preparation for effectively realizing the switchover in the future evolved network.

Figure 2:
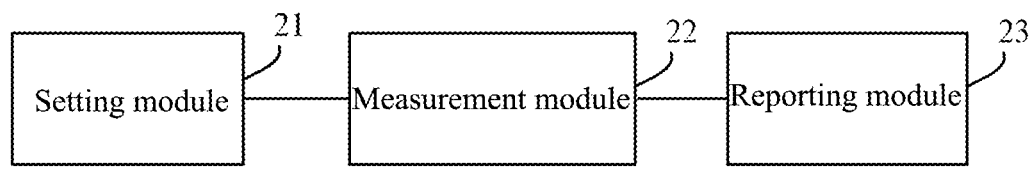
FIG. 2 is a structure diagram of a terminal embodiment of the present document.

As shown in FIG. 2, it is a structure diagram of a terminal embodiment of the present document. the terminal is in a discontinuous reception (DRX) state and includes a setting module 21.

The setting module is configured to set a measurement period in the following way:

T=N×Max ($P_{DRX}$, Pcsi-rs) and T>=200 milliseconds; or

T=N×Max ($P_{DRX}$, 0.08 seconds) and T>=200 milliseconds; or

T=N×LCM ($P_{DRX}$, Pcsi-rs) and T>=200 milliseconds;

wherein T is the measurement period, N is a natural number, Pcsi-rs is a transmission period of the CSI-RS, the $P_{DRX}$ is a DRX period of the terminal, the Max ($P_{DRX}$, Pcsi-rs) represents selecting a maximum value of the $P_{DRX}$ and the Pcsi-rs, the Max ($P_{DRX}$, 0.08 seconds) represents selecting a maximum value of the $P_{DRX}$ and 0.08 seconds, and the LCM ($P_{DRX}$, Pcsi-rs) represents a least common multiple of the $P_{DRX}$ and the Pcsi-rs.

In addition, the terminal further includes: a measurement module 22, configured to measure the CSI-RSRP as per the measurement period set by the setting module according to a channel state information reference signal (CSI-RS). Specifically, it can be measuring the CSI-RSRP as per the measurement period set by the setting module according to the CSI-RS sent by the base station.

The measurement module is specifically configured to: measure the CSI-RSRP according to the CSI-RS of one or more subframes in one measurement period. The frequency domain bandwidth of the CSI-RS>=6PRB; or, the frequency domain bandwidth of the CSI-RS is the system bandwidth of the base station signal.

In addition, the terminal further includes: a reporting module 23, configured to: report CSI-RSRP information measured by the measurement module to a current serving base station of the terminal according to a period reporting way. The period for reporting the CSI-RSRP information can be equal to the measurement period and also can be not equal to the measurement period. Or, the reporting module is also configured to: report CSI-RSRP information measured by the measurement module to a current serving base station of the terminal according to a triggering reporting way. At this moment, the measurement module is specifically configured to: measure the CSI-RSRP as per the measurement period according to the CSI-RS sent by the base station which configures a CSI-RS signal related to the terminal.

Further, the measurement module is specifically configured to: measure and obtain the CSI-RSRP according to the CSI-RS of a single antenna port configured by the base station; or, to measure and obtain the CSI-RSRP according to the CSI-RSs of 2 antenna ports configured by the base station respectively, and take a sum of the two obtained CSI-RSRPs as the measured CSI-RSRP; or, to measure and obtain the CSI-RSRP according to the CSI-RSs of 2 antenna ports configured by the base station respectively, and take a mean value of the two obtained CSI-RSRPs as the measured CSI-RSRP.

Preferably, when the measurement period set by the setting module is: T=N×Max($P_{DRX}$, Pcsi-rs), and T>=200 milliseconds, a preferred value of the measurement period is any one of the following situations:

when $P_{DRX}$<=40 ms and Pcsi-rs=5, 10, 20 or 40 subframes or ms, the T is preferably 200 or 400 ms;

when 40 ms<$P_{DRX}$<=80 ms and Pcsi-rs=5, 10, 20 or 40 subframes or ms, the T is preferably 320 or 640 ms;

when $P_{DRX}$<=80 ms and Pcsi-rs=80 subframes or ms, the T is preferably 400 or 800 ms;

when 80 ms<$P_{DRX}$<=120 ms and Pcsi-rs=5, 10, 20 or 40 subframes or ms, the T is preferably 5*$P_{DRX}$;

when 80 ms<$P_{DRX}$<=120 ms and Pcsi-rs=80 subframes or ms, 5*$P_{DRX}$<=T<=10*$P_{DRX}$;

when $P_{DRX}$<=40 ms and Pcsi-rs<=40 subframes or ms, the T is preferably 400 ms;

when 40 ms<$P_{DRX}$<=80 ms, and Pcsi-rs<=40 subframes or ms, the T is preferably 640 ms;

when $P_{DRX}$<=80 ms, and Pcsi-rs=80 subframes or ms, the T is preferably 800 ms;

when 80 ms<$P_{DRX}$<=120 ms, and Pcsi-rs<=40 subframes or ms, the T is preferably 5*$P_{DRX}$.

Similarly, when the measurement period set by the setting module is: T=N×Max($P_{DRX}$, 0.08 seconds), and T>=200 milliseconds, a preferred value of the measurement period is any one of the following situations:

when $P_{DRX}$>0.08 ms, the T is preferably 5*$P_{DRX}$; and when $P_{DRX}$<=0.08 ms, the T is preferably 0.4 seconds.

The above-mentioned terminal provides the setting of the CSI-RSRP measurement period under the DRX mode, which makes abundant preparation for effectively realizing the switchover in the future evolved network.

It can be understood by those skilled in the art that all or part of steps in the above-mentioned method can be fulfilled by programs instructing the relevant hardware components, and the programs can be stored in a computer readable storage medium such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in the form of hardware, or in the form of software function module. The present document is not limited to any specific form of the combination of the hardware and software.

The above-mentioned embodiments are only used to illustrate but not to limit the technical scheme of the present document, and the present document is described in details only referring to the preferable embodiments. Those skilled in the art should understand that they can make the modifications and equivalents according to the technical scheme of the present document without departing from the spirit and scope of the present document, which should be embodied in the scope of the appended claims of the present document.

INDUSTRIAL APPLICABILITY

The above-mentioned method for configuring the CSI-RSRP measurement period and terminal provide the setting of the CSI-RSRP measurement period under the DRX mode, which makes abundant preparation for effectively realizing the switchover in the future evolved network.

What we claim is:

1. A method for configuring a channel state information reference signal (CSI-RS) received power (CSI-RSRP) measurement period, comprising:
    setting a CSI-RSRP measurement period by a terminal in a discontinuous reception (DRX) state comprising at least following features:
    setting a measurement period as an integral multiple of a maximum of a DRX period of the terminal and 0.08 seconds, and the measurement period is more than or equal to 200 milliseconds; or
    setting a measurement period as an integral multiple of a least common multiple of a DRX period of the terminal and a transmission period of CSI-RS, and the measurement period is more than or equal to 200 milliseconds;
    measuring, by the terminal, a CSI-RSRP as per the set measurement period according to the CSI-RS.

2. The method according to claim 1, wherein
    the terminal measuring the CSI-RSRP as per the measurement period according to the CSI-RS comprises:
    the terminal measuring the CSI-RSRP according to CSI-RS of one or more subframes in one measurement period.

3. The method according to claim 1, wherein after the terminal measures the CSI-RSRP, the method further comprises:
    the terminal reporting CSI-RSRP information to a current serving base station of the terminal according to a period reporting way, preferably a period for reporting the CSI-RSRP information is equal to the measurement period;
    or
    the terminal reporting CSI-RSRP information to a current serving base station of the terminal according to a triggering reporting way.

4. The method according to claim 1, wherein
    the terminal measuring the CSI-RSRP as per the set measurement period according to the CSI-RS comprises:
    the terminal measuring the CSI-RSRP as per the measurement period according to a CSI-RS sent by a base station.

5. The method according to claim 4, wherein
    the terminal measuring the CSI-RSRP as per the measurement period according to the CSI-RS sent by the base station comprises:
    the terminal measuring the CSI-RSRP as per the measurement period according to a CSI-RS sent by a base station which configures a CSI-RS signal related to the terminal.

6. The method according to claim 2, wherein
    a frequency domain bandwidth of the CSI-RS>=6PRB; or
    a frequency domain bandwidth of the CSI-RS is a system bandwidth of the base station signal.

7. The method according to claim 4, wherein
    the terminal measuring the CSI-RSRP as per the measurement period according to the CSI-RS sent by the base station comprises:
    the terminal measuring and obtaining the CSI-RSRP according to a CSI-RS of a single antenna port configured by the base station; or
    the terminal measuring and obtaining CSI-RSRPs according to CSI-RSs of 2 antenna ports configured by the base station respectively, and taking a sum of two obtained CSI-RSRPs as a measured CSI-RSRP; or
    the terminal measuring and obtaining CSI-RSRPs according to CSI-RSs of 2 antenna ports configured by the base station respectively, and taking a mean value of two obtained CSI-RSRPs as a measured CSI-RSRP.

8. The method according to claim 1, wherein
    when the measurement period is set as: the measurement period being an integral multiple of a maximum of the DRX period of the terminal and the transmission period of CSI-RS and the measurement period being more than or equal to 200 milliseconds, a preferred value of the measurement period T is any one of following situations:
    when $P_{DRX}<=40$ ms and Pcsi-rs=5, 10, 20 or 40 subframes or ms, the T is preferably 200 or 400 ms;
    when 40 ms$<P_{DRX}<=80$ ms and Pcsi-rs=5, 10, 20 or 40 subframes or ms, the T is preferably 320 or 640 ms;
    when $P_{DRX}<=80$ ms and Pcsi-rs=80 subframes or ms, the T is preferably 400 or 800 ms;
    when 80 ms$<P_{DRX}<=120$ ms and Pcsi-rs=5, 10, 20 or 40 subframes or ms, the T is preferably $5*P_{DRX}$;
    when 80 ms$<P_{DRX}<=120$ ms and Pcsi-rs=80 subframes or ms, $P_{DRX}<=T<=10*P_{DRX}$;
    when $P_{DRX}<=40$ ms and Pcsi-rs$<=40$ subframes or ms, the T is preferably 400 ms;
    when 40 ms$<P_{DRX}<=80$ ms and Pcsi-rs$<=40$ subframes or ms, the T is preferably 640 ms;
    when $P_{DRX}<=80$ ms and Pcsi-rs=80 subframes or ms, the T is preferably 800 ms;
    when 80 ms$<P_{DRX}<=120$ ms and Pcsi-rs$<=40$ subframes or ms, the T is preferably $5*P_{DRX}$; and
    when $P_{DRX}>120$ ms, the T is preferably $5*P_{DRX}$,
    wherein the T is the measurement period, Pcsi-rs is the transmission period of CSI-RS and $P_{DRX}$ is a DRX period of the terminal.

9. The method according to claim 1, wherein
    when the measurement period is set as: the measurement period being an integral multiple of a maximum of a DRX period of the terminal and 0.08 seconds and the measurement period being more than or equal to 200 milliseconds, a preferred value of the measurement period T is any one of following situations:
    when $P_{DRX}>0.08$ s, the T is preferably $5*P_{DRX}$; and
    when $P_{DRX}<=0.08$ s, the T is preferably 0.4 seconds, wherein the T is the measurement period and $P_{DRX}$ is a DRX period of the terminal.

10. A terminal, in a discontinuous reception (DRX) state, the terminal comprising hardware performing instructions stored in a non-transitory computer readable medium which executes steps in a following module:
a setting module, configured to set a CSI-RSRP measurement period which comprises at least following features:
a measurement period is an integral multiple of a maximum of a DRX period of the terminal and 0.08 seconds, and the measurement period is more than or equal to 200 milliseconds; or
a measurement period is an integral multiple of a least common multiple of a DRX period of the terminal and a transmission period of CSI-RS, and the measurement period is more than or equal to 200 milliseconds;
a measurement module, configured to measure a CSI-RSRP as per the measurement period set by the setting module according to a channel state information reference signal (CSI-RS).

11. The terminal according to claim 10, wherein
the measurement module is configured to: measure the CSI-RSRP according to CSI-RS of one or more subframes in one measurement period.

12. The terminal according to claim 10, wherein the hardware further performs instructions stored in a non-transitory computer readable medium which executes steps in a following module:
a reporting module, configured to: report CSI-RSRP information measured by the measurement module to a current serving base station of the terminal according to a period reporting way, preferably a period for reporting the CSI-RSRP information is equal to the measurement period;
or
a reporting module, configured to: report CSI-RSRP information measured by the measurement module to a current serving base station of the terminal according to a triggering reporting way.

13. The terminal according to claim 10, wherein
the measurement module is configured to: measure the CSI-RSRP as per the measurement period according to a CSI-RS sent by a base station.

14. The terminal according to claim 13, wherein
the measurement module is configured to: measure the CSI-RSRP as per the measurement period according to a CSI-RS sent by a base station which configures a CSI-RS signal related to the terminal.

15. The terminal according to claim 11, wherein
a frequency domain bandwidth of the CSI-RS>=6PRB; or
a frequency domain bandwidth of the CSI-RS is a system bandwidth of the base station signal.

16. The terminal according to claim 13, wherein
the measurement module is configured to: measure and obtain the CSI-RSRP according to a CSI-RS of a single antenna port configured by the base station; or
measure and obtain CSI-RSRPs according to CSI-RSs of 2 antenna ports configured by the base station respectively, and take a sum of two obtained CSI-RSRPs as a measured CSI-RSRP; or
measure and obtain CSI-RSRPs according to CSI-RSs of 2 antenna ports configured by the base station respectively, and take a mean value of two obtained CSI-RSRPs as a measured CSI-RSRP.

17. The terminal according to claim 10, wherein:
when the measurement period set by the setting module is that: the measurement period is an integral multiple of a maximum of the DRX period of the terminal and the transmission period of CSI-RS and the measurement period is more than or equal to 200 milliseconds, a preferred value of the measurement period is any one of following situations:
when $P_{DRX}<=40$ ms and Pcsi-rs=5, 10, 20 or 40 subframes or ms, the T is preferably 200 or 400 ms;
when 40 ms<$P_{DRX}<=80$ ms and Pcsi-rs=5, 10, 20 or 40 subframes or ms, the T is preferably 320 or 640 ms;
when $P_{DRX}<=80$ ms and Pcsi-rs=80 subframes or ms, the T is preferably 400 or 800 ms;
when 80 ms<$P_{DRX}<=120$ ms and Pcsi-rs=5, 10, 20 or 40 subframes or ms, the T is preferably $5*P_{DRX}$;
when 80 ms<$P_{DRX}<=120$ ms and Pcsi-rs=80 subframes or ms, $P_{DRX}<=T<=10*P_{DRX}$;
when $P_{DRX}<=40$ ms and Pcsi-rs<=40 subframes or ms, the T is preferably 400 ms;
when 40 ms<$P_{DRX}<=80$ ms and Pcsi-rs<=40 subframes or ms, the T is preferably 640 ms;
when $P_{DRX}<=80$ ms and Pcsi-rs=80 subframes or ms, the T is preferably 800 ms;
when 80 ms<$P_{DRX}<=120$ ms and Pcsi-rs<=40 subframes or ms, the T is preferably $5*P_{DRX}$; and
when $P_{DRX}>120$ ms, the T is preferably $5*P_{DRX}$;
wherein the T is the measurement period, Pcsi-rs is the transmission period of CSI-RS and $P_{DRX}$ is a DRX period of the terminal.

18. The terminal according to claim 10, wherein
when the measurement period set by the setting module is that: the measurement period is an multiple of a maximum of the DRX period of the terminal and 0.08 seconds and the measurement period is more than or equal to 200 milliseconds, a preferred value of the measurement period is any one of following situations:
when $P_{DRX}>0.08$ s, the T is preferably $5*P_{DRX}$; and
when $P_{DRX}<=0.08$ s, the T is preferably 0.4 seconds;
wherein the T is the measurement period and $P_{DRX}$ is a DRX period of the terminal.

* * * * *